Figure 1:
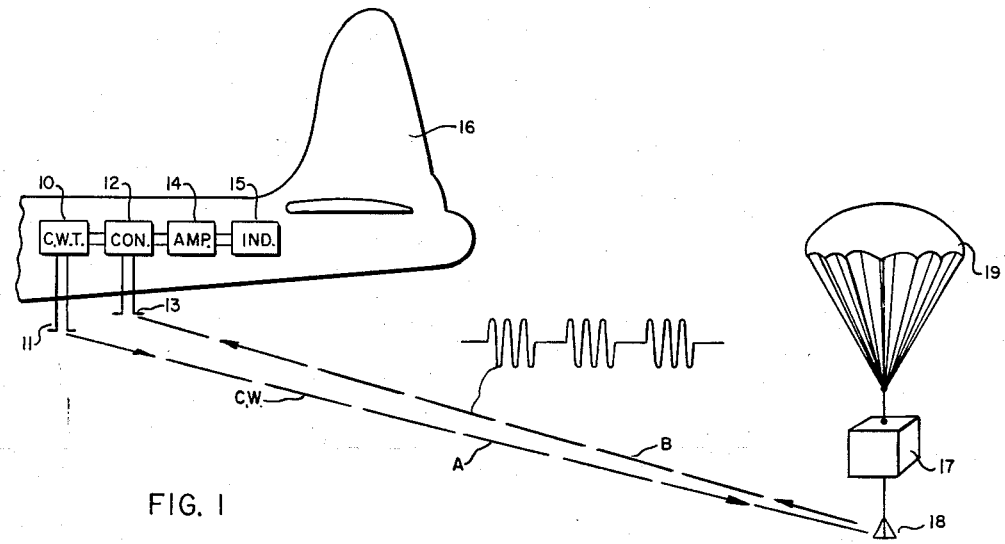

March 26, 1957 — W. TODD — 2,786,996
WAVE MEASURING SYSTEM
Filed Jan. 4, 1952

INVENTOR.
WILLIAM TODD
BY Harry M. Saragovitz
Attorney

United States Patent Office 2,786,996
Patented Mar. 26, 1957

2,786,996

WAVE MEASURING SYSTEM

William Todd, Interlaken, N. J., assignor to the United States of America as represented by the Secretary of the Army Application January 4, 1952, Serial No. 265,021

10 Claims. (Cl. 343—8)

(Granted under Title 35, U. S. Code (1952), sec. 266)

The invention described herein may be manufactured and used by or for the Government for governmental purposes, without the payment of any royalty thereon.

This invention relates to a wave measuring system and particularly to a wave measuring system for determining the relative velocity of two stations by measurement of the doppler frequency component which results from the relative motion of the stations. In particular, the invention relates to a wave measuring system for determining the relative velocity between two stations by means of radiating ultra high frequency radio waves from an interrogating station to a transponder-beacon station, receiving pulse modulated ultra high frequency waves returned from that station and measuring the doppler frequency corresponding to the relative velocity of the two stations.

Velocity measuring systems based upon measuring doppler frequencies are now well known and a variety of systems for such measurements have been developed. Where it is desired to provide a wave measuring system of the doppler type to measure the relative velocity between two stations, at least one of which is in motion, it has heretofore been proposed to employ interrogating apparatus at the station making the measurement and a transponder-beacon at the other station to return a reply signal to the interrogating station. In such proposed systems, the problem of returning a reply signal from the transponder-beacon station which is of adequate power, does not interfere with the incoming wave and is also coherent in frequency and phase so that the doppler frequency may be measured, has proved to be a formidable problem. If a coherent wave is to be returned from a transponder-beacon station, a conventional system might be one that would receive the wave from the interrogating station, amplify it to a suitable power level and retransmit it without loss of coherence. To accomplish this by conventional means would require considerable apparatus and complexity of the circuits. Also, suitable provisions would be necessary to prevent the transmitted wave energy from affecting the receiving circuits of the transponder.

It is, accordingly, an object of the present invention to provide a wave measuring system for determining velocity between two stations comprising an interrogating station and a beacon reply station which avoids many of the disadvantages and limitations of prior art systems.

It is a further object of the present invention to provide a wave measuring system for determining the relative velocity between an interrogating station and a beacon reply station by producing at the beacon station periodic pulses of a wave which is coherent in frequency and phase with the wave signal received by the beacon.

It is an additional object of the present invention to provide a wave measuring system for determining the relative velocity between two stations, one of which is a beacon reply station, by utilizing a super-regenerative transponder circuit for returning periodic pulses of a wave coherent in frequency and phase with a received continuous wave signal.

In accordance with the present invention, a wave measuring system for determining the velocity between two stations comprises an interrogating station and a beacon reply station. Means are provided at the interrogating station for generating and transmitting a continuous wave signal of reference frequency. Means at the beacon station are provided for receiving the continuous wave signal and for simultaneously generating and transmitting a reply signal which is comprised of periodic pulses of a wave which is coherent in frequency and phase with the received continuous wave signal. Also provided at the interrogating station are means for receiving the reply wave signal together with a portion of the generated wave of reference frequency with means for converting the received wave and the wave of reference frequency to produce a wave of doppler frequency and means for utilizing the wave of doppler frequency to measure the relative velocity of the two stations.

For a better understanding of the present invention, together with other and further objects thereof, reference is had to the following description taken in connection with the accompanying drawing and its scope will be pointed out in the appended claims.

Figure 2:
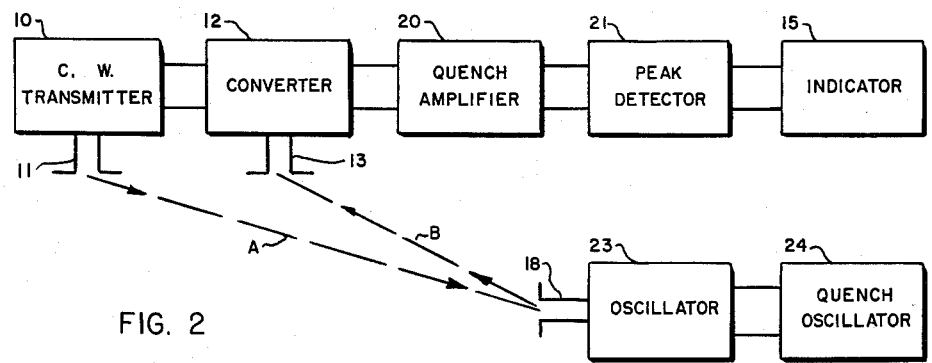
Figure 3:
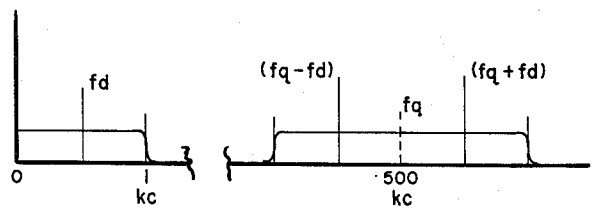

In the drawing, Fig. 1 is a representation, partly in block diagram, which illustrates the fundamental arrangement of the system in an embodiment suitable for measuring wind velocity in the region below an aircraft; Fig. 2 is a block diagram of the interrogating station and the transponder-beacon station illustrating a preferred arrangement of the invention; and, Fig. 3 is a frequency spectrum diagram for use in explaining the operations of the system shown in Figs. 1 and 2.

Referring now to Fig. 1 of the drawing, the interrogating station is indicated as being carried aboard an aircraft 16 and is comprised of a continuous wave transmitter 10 to which is coupled a radiating antenna 11. The transmitter 10 may be any convenient form of vacuum tube oscillator which continuously generates a carrier frequency wave. An output of 10 is also coupled to an input of a converter or detector 12. Also coupled to an input of converter 12 is a receiving antenna 13. The converter or detector 12 is the usual arrangement of a heterodyne detector wherein a portion of the wave energy from transmitter 10 is mixed with wave energy received on antenna 13 and rectified to produce a wave of difference frequency output in known manner. The output of converter 12 is coupled to an amplifier 14, which in this simple embodiment of the invention consists of an amplifier, such as an audio amplifier, suitable for developing and amplifying doppler frequencies. The output of 14 is coupled to an indicating unit 15, which may be a frequency meter or cycle counter or the like, and which may be arranged to indicate directly the velocity in miles per hour.

The transponder-beacon station is illustrated as a unit 17 which is supported, so as to fall slowly, by a parachute 19. Coupled to the unit 17 is an antenna 18 for receiving continuous wave signals from the interrogating station and radiating reply signals thereto. The transponder-beacon 17 consists of a super-regenerative transponder which receives the continuous wave signals from the interrogating station and returns reply signals which are periodic pulses of a wave coherent in frequency and phase with the received continuous wave signal.

Considering now the operation of the system, the continuous wave radiated from antenna 11 travels at the velocity of light over path A and reaches antenna 18 with the delay of travel and, what is more important, for the purposes of the present invention, with a phase which is changing at a rate proportional to the relative velocity at which the stations are moving. The rate of change of phase equals a doppler frequency. Accordingly, the frequency of the wave received at antenna 18 is greater or less than the carrier wave radiated from antenna 11 by a doppler frequency component. The frequency is increased or decreased depending upon the sense of the relative velocity of the stations. Assuming for purposes of explanation that the stations are receding from each other, then the frequency of the wave arriving at antenna 18 will be $f_c - f_d/_2$, where $f_c$ is the carrier frequency of the wave radiated from antenna 11 and the $f_d/_2$ indicates the doppler frequency component produced in the wave in traveling from antenna 11 to antenna 18. If this wave were directly returned over path B as in the case of a reflection, the returned wave when received at antenna 13 would be of a frequency $f_c - f_d$, where $f_d$ represents the total doppler frequency produced by the travel of the wave to and from antenna 18 for a constant velocity of motion between the stations.

The wave returned from antenna 18 is, however, not one which is due to reflection, but is here generated by the super-regenerative transponder unit 17. The super-regenerative transponder is a known type of transponder-beacon frequently used in distance measuring systems. An example of such a transponder-beacon is described in U. S. Patent #2,524,495, to M. K. Taylor et al., issued October 3, 1950. It is to be noted, however, that the coherence of the pulse waves produced by super-regenerative transponder were of no utility in the prior art uses of the device. The essential features of the super-regenerative transponder comprise a vacuum tube oscillator coupled to the antenna in a circuit arrangement wherein the oscillations are periodically quenched at some chosen rate.

The oscillator for the purposes of the present invention is tuned in the region of the carrier wave $f_c$ which may be, for example, at a frequency of 400 megacycles, so that the doppler frequency components fall in an audio frequency range extending from zero to, say, 1000 cycles for values of relative velocity between zero and 800 miles per hour. For such a range of velocities, a quench frequency of, say, 500 kilocycles per second is suitable and the circuit arrangement is preferably such that oscillations which are built up during each pulse interval are completely quenched before the occurrence of the next pulse interval. Under such conditions, it has been found that the oscillations will, at the start of each pulse interval, begin in phase and in frequency with the wave which is being received. If the oscillations were permitted to build up and continue, they would eventually drift to the natural resonant frequency set by the oscillator's tuning. Before this can occur, however, the oscillations are quenched. Any slight drift toward the resonant frequency which does occur after the start of oscillations is random for each pulse interval and in effect such frequency drift is equivalent to random noise in the system. Accordingly, the super-regenerative transponder receives a continuous wave which is modified by a doppler frequency in traveling from antenna 11 to antenna 18 and simultaneously generates and transmits a reply signal consisting of periodic pulses at the quench frequency rate, which pulses are pulses of a wave coherent in frequency and in phase with the received continuous wave signal.

The wave radiated by antenna 18 is, therefore, a pulse modulated wave and a wave of this type has certain features which may be efficiently utilized in several ways as will be presently described in connection with the preferred arrangement shown in Fig. 2. For the simpler arrangement of Fig. 1, the coherent pulse modulated wave from antenna 18 is received at the interrogating station by antenna 13 and applied to the converter 12 together with a portion of the wave energy from the transmitter 10 which here serves as a wave of reference frequency We, therefore, have mixed in converter 12 the wave of reference frequency $f_c$ and the wave of frequency $f_c - f_c$, where $f_d$ indicates the total doppler frequency due to the travel of the wave from antenna 11 to antenna 18 and back to antenna 13 while there is relative motion between the two stations. The converter unit 12 converts or develops the beat frequency $f_d$ which is illustrated in the frequency spectrum of Fig. 3, for the condition where $f_d$ is a frequency of .5 kilocycle and the audio frequency amplifier 14 provides amplification over a pass band shown as extending from 0 to 1 kilocycle. The frequency $f_d$ is proportional to the velocity between the two stations and its value is registered by the indicator 15 which may be arranged to indicate the doppler frequency or may preferably be calibrated in terms of the corresponding velocity which is the information desired. This simple arrangement for producing the doppler frequency is a straight-forward heterodyne detection system and is possible with the relatively simple apparatus described because of the fact above stated that the pulses transmitted by the super-regenerative beacon are coherent.

It may be pointed out here that the transponder-beacon apparatus here employed for returning coherent pulses is relatively simple in that it need consist of only an oscillator operating in the carrier frequency region and a quench frequency oscillator operating at a chosen quench frequency and, accordingly, is suitable for expandable apparatus of the type shown in Fig. 1. In this embodiment of the invention, the transponder is dropped from the aircraft in flight and descends slowly to the ground, since it is supported by the parachute 19. For military purposes, the determinations of wind velocity made by utilizing the measurements of doppler frequency are coordinated in the aircraft with other suitable equipment.

Consider now a preferred arrangement of the invention shown in Fig. 2 where elements corresponding to those described in Fig. 1 are similarly labeled. The interrogating station consists of the continuous wave transmitter 10 which is coupled to the transmitting antenna 11 and a portion of the wave energy from unit 10 is coupled to an input of converter 12. Receiving antenna 13 is also coupled to converter 12. The output developed by converter 12 is coupled to the input of a quench frequency amplifier 20 and the output of 20 is coupled to the input of a peak detector circuit 21. The quench frequency amplifier 20 may be, for example, a cascade vacuum tube amplifier designed to amplify input signals in a chosen frequency band which includes the quench frequency as the center frequency. The peak detector 21 may be the conventional type of detector circuit which rectifies the wave output of amplifier 20 to produce an output signal representing the envelope of the wave. The output of 21 is, as in Fig. 1, supplied to a suitable indicator circuit 15. The transponder-beacon station is also shown here in block diagram consisting of an oscillator 23 coupled to the antenna 18. A quench frequency oscillator 24 is suitably coupled to the oscillator 23 and operates at a rate $f_q$ of, say, 500 kilocycles so that the oscillations generated in 23 are periodically quenched by a wave having a fundamental frequency $f_q$.

In operation, the continuous wave energy from transmitter 10 is radiated by antenna 11 and travels to antenna 18 of the transponder-beacon by path A. The oscillator 23 starts to generate oscillations during each interval which follows the quenching or suppression of all oscillations by oscillator 24 and these oscillations build up in phase and at the frequency of the wave received over path A. The oscillations which are built up during each pulse transmission interval by oscillator 23 are in phase and of the frequency of the received wave and are returned over path B to antenna 13 of converter 12. Here they are heterodyned with continuous wave energy of reference frequency from unit 10. An analysis of the detection or intermodulation of the reference wave and the received pulse modulated wave shows a variety of modulation components or modulation products. Without going into the writing of the wave equations and trigonometric transformations, which would be similar to those given in most texts in describing and analyzing detection and modulation, the conditions may be simply stated as follows. The coherent pulse modulated oscillations which are received consist of the carrier wave $f_c-f_d$ and a plurality of sidebands corresponding to the fundamental and harmonic frequencies which go to make up the Fourier components of the pulse wave form. When these waves are heterodyned with the wave of reference frequency $f_c$, the analysis shows that among other components there will be produced useful components of frequencies $f_q-f_d$, $f_q+f_d$; $2f_q-f_d$, $2f_q+f_d$; etc. For the purposes of the present invention, the first order sidebands $f_q-f_d$ and $f_q+f_d$ are employed and the unit 20 which is a quench frequency amplifier is designed to provide amplification in a pass band such as that shown in Fig. 3 which extends over a band of 2000 cycles about the mean or quench frequency of 500 kilocycles. In this illustration, the frequency $f_d$ due to doppler effect is indicated as being approximately 500 cycles so that in the pass band are two frequencies $f_q-f_d$ and $f_q+f_d$, which are the first order pair of side frequencies or sidebands. In amplifier unit 20 these frequencies are amplified and applied to the input of the detector 21. It will be noted that the two frequencies differ by a value which is $2f_d$. Detector 21 is preferably of the peak detector type and the two waves applied thereto may be considered to heterodyne each other to produce an output wave of frequency $2f_d$. This frequency is applied to the indicator 15 which, as in Fig. 1, may be a cycle counter or frequency meter and, as in that case, it may be calibrated directly in terms of the relative velocity. It will be noted that in this improved arrangement the doppler frequency to be measured has been multiplied by a factor of two and, accordingly, greater precision may be achieved in its measurement. In addition, there is an advantage in providing amplification in the frequency range of chosen quench frequency since local noise due to electrical disturbances which are commonly encountered in the audio frequency range are thereby avoided. The arrangement of Fig. 2, therefore, provides means at the beacon station in the form of a super-regenerative circuit for producing periodic pulses of the wave generated by oscillator 23 which are coherent in frequency and in phase with the continuous wave signal received at the beacon station and at the interrogating station the couplings to the converter 12 provide means for receiving the reply signal together with a portion of the generated wave of reference frequency. Means for converting these waves to produce a wave of twice the doppler frequency is accomplished by the unit 12, the quench amplifier unit 20 and the peak detector 21, so that the indicator unit 15 may utilize the wave of twice the doppler frequency to measure the relative velocity of the stations.

In the system as above described, the coherence of the pulse modulated wave returned by the transponder-beacon unit is utilized to produce the doppler frequency directly as in the simple arrangement of Fig. 1, or twice the doppler frequency as in the preferred arrangement of Fig. 2.

It was also pointed out that higher order pairs of side frequencies are produced such as $2f_q-f_d$, $2f_q+f_d$; $3f_q-f_d$, $3f_q+f_d$. It will be clear that any of these pairs may be utilized. For example, the unit 20 may be designed to amplify in a band whose center frequency is $2f_q$ or $3f_q$, etc., with the result that the output of detector 21 will, in each case, be a wave of frequency $2f_d$. Other combinations of the different order sidebands may also be used to yield twice the doppler frequency and a plurality of the sideband components may simultaneously be used by employing a suitably wider pass band for the amplifier 20.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave measuring system for determining the velocity between two stations comprising an interrogating station and a beacon reply station, means at said interrogating station for generating and transmitting a continuous wave signal of reference frequency, means at said beacon station for receiving said continuous wave signal and for simultaneously generating and transmitting a reply signal comprising periodic pulses of a wave coherent in frequency and phase with said received continuous wave signal, means at said interrogating station for receiving said reply wave signal together with a portion of said generated wave of reference frequency, means for converting said received wave and said wave of reference frequency to produce a wave of doppler frequency and means for utilizing said wave of doppler frequency to measure the relative velocity of said stations.

2. A wave measuring system in accordance with claim 1, wherein said means for generating a reply signal comprises a super-regenerative circuit comprising an oscillator and a source of quench frequency.

3. A wave measuring system for determining the velocity between two stations comprising an interrogating station and a beacon reply station, means at said interrogating station for generating and transmitting a continuous wave signal of reference frequency, means at said beacon station for receiving said continuous wave signal and for simultaneously generating and transmitting a reply signal comprising periodic pulses of a wave coherent in frequency and phase with said received continuous wave signal, means at said interrogating station for receiving said reply wave signal together with a portion of said generated wave of reference frequency, means for converting said received wave and said wave of refenece frequency to produce waves which differ by a multiple of a doppler frequency, means for detecting said waves which differ to produce a wave which is a multiple of said doppler frequency and means for utilizing said wave of multiple doppler frequency to measure the relative velocity of said stations.

4. A wave measuring system in accordance with claim 3, wherein said means for generating a reply signal comprises a super-regenerative circuit comprising an oscillator and a source of quench frequency.

5. A wave measuring system for determining the velocity between two stations comprising an interrogating station and a beacon reply station, means at said interrogating station for generating and transmitting a continuous wave signal of reference frequency, means at said beacon station for receiving said continuous wave signal and for simultaneously generating and transmitting a reply signal comprising periodic pulses of a wave coherent in frequency and phase with said received continuous wave signal, means at said interrogating station for receiving said reply wave signal together with a portion of said generated wave of reference frequency, means for converting said received wave and said wave of reference frequency to produce a pair of waves having the periodicity of said pulses plus and minus a doppler frequency, means for selectively amplifying and detecting said pair to produce a wave which is twice said doppler frequency and means for utilizing said wave of twice doppler frequency to measure the relative velocity of said stations.

6. A wave measuring system in accordance with claim 5, wherein said means for generating a reply signal comprises a super-regenerative circuit comprising an oscillator and a source of quench frequency.

7. A wave measuring system for determining the velocity between two stations comprising an interrogating station and a beacon reply station, means at said interrogating station for generating and transmitting a continuous wave signal of reference frequency, means at said beacon station for receiving said continuous wave signal and for simultaneously generating and transmitting a reply signal comprising periodic pulses of a wave coherent in frequency and phase with said received continuous wave signal, means at said interrogating station for receiving said reply wave signal together with a portion of said generated wave of reference frequency, means for converting said received wave and said wave of reference frequency to produce a plurality of waves including pairs of said band waves having the periodicity of said pulses modified by a doppler frequency, means for selectively amplifying and detecting a chosen pair of said sideband waves to produce a wave which is a multiple of said doppler frequency and means for utilizing said wave of multiple doppler frequency to measure the relative velocity of said stations.

8. A wave measuring system in accordance with claim 7, wherein said means for generating a reply signal comprises a super-regenerative circuit comprising an oscillator and a source of quench frequency.

9. A wave measuring system comprising a continuous wave interrogating station and a super-regenerative transponder-beacon reply station each within the range of the other and means at said interrogating station for converting wave energy received from said reply station with continuous wave energy generated at said interrogating station to produce a wave of doppler frequency and means utilizing said wave of doppler frequency to determine the relative velocity of motion between said stations.

10. A wave measuring system comprising a continuous wave interrogating station and a transponder-beacon reply station each within the range of the other, said transponder-beacon comprising a super-regenerative circuit for transmitting pulses of coherent wave energy at a quench frequency rate and means at said interrogating station for converting wave energy received from said reply station with continuous wave energy generated at said interrogating station to produce waves of said quench frequency each modified by a doppler frequency component, means for amplifying and detecting said waves of modified quench frequency to produce a wave proportional to said doppler frequency and means for utilizing said wave proportional to said doppler frequency to determine the relative velocity of motion between said stations.

References Cited in the file of this patent
UNITED STATES PATENTS

| | | |
|---|---|---|
| 1,750,668 | Green | Mar. 18, 1930 |
| 2,134,716 | Gunn | Nov. 1, 1938 |
| 2,268,587 | Guanella | Jan. 6, 1942 |
| 2,455,639 | Anderson | Dec. 7, 1948 |
| 2,524,495 | Taylor et al. | Oct. 3, 1950 |
| 2,535,038 | Busignies | Dec. 26, 1950 |
| 2,592,777 | Williams | Apr. 15, 1952 |
| 2,629,865 | Barker | Feb. 24, 1953 |